United States Patent [19]
Van Grinsven et al.

[11] Patent Number: 5,619,504
[45] Date of Patent: Apr. 8, 1997

[54] TELECOMMUNICATION SYSTEM AND A MAIN STATION FOR USE IN SUCH A SYSTEM

[75] Inventors: Petrus A. M. Van Grinsven; Wilfred A. M. Snijders, both of Eindhoven, Netherlands

[73] Assignee: U.S. Philips Corporation, New York, N.Y.

[21] Appl. No.: 213,483

[22] Filed: Mar. 14, 1994

[30] Foreign Application Priority Data

Mar. 15, 1993 [EP] European Pat. Off. .............. 93200743

[51] Int. Cl.⁶ .................................................. H04J 3/10
[52] U.S. Cl. ............................................ 370/347; 370/442
[58] Field of Search .............................. 370/95.1, 95.3, 370/100.1, 105.1, 85.1, 85.6; 455/56.1, 54.1; 379/63; 340/825.5; 375/1, 20, 200, 293, 367, 359, 355, 356; 359/18, 123, 128

[56] References Cited

U.S. PATENT DOCUMENTS 5,321,690  6/1994  Sata ........................................ 370/95.3
5,331,316  7/1994  Mestdagh et al. ..................... 370/95.3

FOREIGN PATENT DOCUMENTS 0521197  1/1993  European Pat. Off. .
9106157  5/1991  WIPO .

OTHER PUBLICATIONS

"Burst and Bit Synchronization Methods for Passive Optical Networks" C.A. Eldering et al, 4th Workshop on Optical Local Networks, IEEE, Sep. 24, 25, 1992 pp. 38–44.
"Survey of Synchronization Techniques for a TDMA Satellite–Switched System" IEEE Transactions on Communications, vol. COM–28, No. 8, Aug. 1980.

Primary Examiner—Douglas W. Olms
Assistant Examiner—Dang Ton
Attorney, Agent, or Firm—Leroy Eason

[57] ABSTRACT

Telecommunication systems such as PON-FITL-Systems are known having a TDMA frame structure and comprising a main station and a number of substations. The known systems can comprise apparatus for coarse ranging and for fine ranging. A Pseudo Noise Sequence based coarse ranging technique employs coarse ranging at a fixed position within the upstream multiframe reserved for ranging, preferably for fine ranging. By applying a low power Pseudo Noise Sequence for coarse ranging and sampling the range in the main station only within a fine ranging window the position of which is known to the main station, a more accurate coarse ranging is achieved. Within the fine ranging window normally no data are present, and thus the signal-to-interference ratio is an order of magnitude better than in the other part of the frame.

20 Claims, 4 Drawing Sheets

TELECOMMUNICATION SYSTEM AND A MAIN STATION FOR USE IN SUCH A SYSTEM

BACKGROUND OF THE INVENTION

The present invention relates to a telecommunication system comprising a main station and a plurality of substations, in which system communication between the main station and the substations occurs via a transmission channel on the basis of a multiple access protocol, which channel is at least partially common to the substations. For coarse ranging the substations are provided with ranging transmission means for transmitting a low magnitude ranging sequence with respect to the magnitude of data to be transmitted in time slots, and the main station is provided with correlation means for recovering ranging information by correlating a received ranging sequence with a reference sequence which is identical to the transmitted sequence. The main station is provided with means for providing the reference sequence. Depending on the transmission channel used, i.e. a glass fibre, a coaxial cable or a radio link, the telecommunication system can be a passive optical network (PON), a local area network, a satellite communication system or a cellular mobile radio system.

The present invention further relates to a main station for use in such a system.

A telecommunication system of this kind is known from the article, "Burst and bit synchronization methods for passive optical networks", C. A. Eldering et al., 4th Workshop on Optical Local Networks, IEEE, Sep. 24, 25 1992, Versailles, France, pp. 38–44. In the article various synchronization techniques are described, such as burst synchronization or coarse ranging, such synchronization being necessary to prevent substations from interfering with each other due to non-synchronized operation, i.e. to prevent data transmitted from the substations to the main station from arriving at the main station simultaneously. In the known telecommunication system, an optical network, the main station may transmit data and messages in time slots within a frame to the substations, in the downstream direction, in a controlled way, i.e. the main station or master has full control over the timing of the data to be transmitted to the various substations. In the upstream direction, from the substations to the main stations the most common technique is a Time Division Multiple Access Technique CFDMA), which requires that the delays between the substations and the main station be known and that a suitable delay be incorporated in the transmission from each substation so that the burst transmissions arrive at the specified or allocated time slots for the substations with respect to the main station timing. Such TDMA techniques can be used in combination with a frame structure or without a frame structure, the latter as ATM (Asynchronous Transfer Mode) cells to be transported using a TDMA protocol. Especially when no frame structure is present it becomes essential to have a non-intrusive coarse ranging for the ATM transport on fiber, but also with a frame structure a non intrusive coarse ranging method can be used, i.e. a method which practically does not interfere with the transmissions from in-service substations. On page 41 of said IEEE article a non intrusive coarse ranging technique is disclosed based upon correlation techniques. The known coarse ranging technique, i.e. ranging with an accuracy of a few data bits, is based on correlation of transmitted and received sequences, and estimates the range between the main station and the substation of an out-of-service substation while the other substations may continue transmission of information. The substation to be ranged transmits a long ranging sequence with very low magnitude and at a lower speed than transmission of data (e.g. in a TDMA ATM architecture a bit period of the ranging sequence corresponds to a cell period). A sequence with good correlation properties is chosen, the low power being necessary to prevent disturbance to the data to be disturbed by the sequence, which behaves like a Pseudo Noise Sequence. The ranging sequence can be a maximum length sequence with finite length ($2^n-1$), i.e. a sequence obtainable with a linear feedback shift register or a linear sequence generator, described in numerous handbooks on Logic Design. At the main station side, the ranging information can be recovered from the received ranging sequence using correlation techniques. Therefore, the received signal is sampled in the main station's receiver and correlated with the transmitted, i.e. known, maximal length sequence. In FIG. 6, page 41 of said IEEE article for this purpose a correlation receiver is disclosed, an output of which gives an immediate indication of the delay between the main station and the substation to be ranged. Apart from mentioning that experiments were carried out with maximum length sequences of 15 to 127 bits in this coarse ranging system, no implementation is disclosed with respect to the correlator. The correlation has been described in relation to TDMA ATM having no frame structure. The IEEE-article further discloses coarse ranging techniques with respect to a TDMA based PON having a frame structure, these techniques being based upon recognition in the main station of ranging bits to be transmitted in preambles of bursts by the substations. Because of the fact that the magnitude of the ranging bits is in the same order as the magnitude of the data to be transmitted by other substations, a ranging window is provided with the main station's frame to allow substations which are coming into service to transmit bursts for coarse ranging purposes.

In the, PCT Application WO 91/06157 a passive optical network is disclosed with a frame based TDMA communication protocol in which network upstream TDMA times are transmitted from the substations to the main station with ranging pulses for coarse ranging and ranging pulses for fine ranging to compensate for different delays associated with the substations with respect to the main station. As compared with the correlation technique disclosed in said IEEE-article with respect to the frameless TDMA ATM system, extra bits are necessary for coarse and fine ranging, thus decreasing frame efficiency.

It is an object of the present invention to provide a more accurate coarse ranging correlation technique for an operational telecommunication system.

To this end a telecommunication system according to the present invention is characterized in that the communication is frame based, and in that for coarse ranging the correlation means only correlate samples of the received ranging sequence substantially falling: inside a time window reserved in the frame for ranging. The present invention is; based upon the insight that in a system in operation, operational substations are monitored by the main station in a ranging window, preferably a fine ranging window, in which window no data interference is present, the ranging sequence in principle being transmitted during a complete upstream multiframe. This time window, the time position of which is known to the main station and preferably being reserved for fine ranging, is used during coarse ranging for acquiring samples to be correlated with the reference sequence, the samples thus substantially being free of interference with data from other substations already in operation. Consequently, the signal to interference ratio of the received coarse ranging signal is an order of magnitude better than in other parts of the frame. Due to the improved signal to interference ratio the phase of the received ranging sequence with respect to the reference sequence can be determined more accurately as compared with a low magnitude ranging sequence having the same magnitude in a system where correlation samples would be acquired at a random position within the frame. In such a system the correlation process would be subject to low frequency components of the data from other substations and to receiver noise. Although the ranging sequence can be operated at the data bitrate, for practical reasons it is advantageous to apply a ranging sequence bitrate which is fraction of the data bitrate, e.g. 0.1, in order to avoid high sampling rates within the system. The magnitude of the coarse ranging sequence in the system according to the invention can be reduced with respect to a sequence sampled in a randomly chosen window. In the latter case the still lower magnitude ranging sequence interferes less with the data of operational substations, giving overall better system performance. In the case of a telecommunication system with one kind of ranging, such as a mobile radio system, the ranging according to the present invention is applied by sampling in a reserved window only.

In an embodiment of the system according to the present invention, the bitrate of the ranging sequence is lower than the data bitrate of the substations, and in addition to correlation of samples of the received ranging sequence inside the time window, the correlation means correlate samples of the received ranging sequence outside the time window, substantially more samples being taken inside the time window than outside the time window. In this embodiment more samples are available for correlation so that the phase of the received sequence can be determined more accurately.

In a further embodiment of a system according to the present invention, the main station comprises a low-pass filter for filtering the received ranging sequence before it is fed to the correlation means, the low-pass filter having a cut-off frequency substantially coinciding with the frequency of the received ranging signal. If the ranging sequence bitrate is lower than the data bitrate, higher frequency components of the data are suppressed, improving system performance due to an increased signal to interference ratio for coarse ranging samples outside the fine ranging window. In fact, the latter is a combined use of a selectively chosen correlation window as of the present invention and an out-of-band signalling technique. Out-of-band signalling techniques are known per se from the said IEEE article, page 40.

The present invention will now be described, by way of example, with 5 reference to the accompanying drawings, wherein FIG. 1 schematically shows a telecommunication system according to the present invention, FIG. 2 shows a main station for use in the telecommunication system according to the present invention, FIG. 3 shows processing means for processing coarse ranging samples according to the present invention, FIG. 4 shows an embodiment of a correlator for use in the processing means, FIG. 5 shows a substation for use in the telecommunication system, FIG. 6 shows a TDMA frame structure used in the telecommunication system, illustrating coarse ranging according to the present invention, FIG. 7, shows the TDMA frame structure with respect to an embodiment of the present invention, and FIG. 8 shows a frequency spectrum of ranging bits and data in an embodiment of the present invention.

Throughout the figures the same reference numerals are used for the same features.

DETAILED DESCRIPTION OF THE PREFERRED EMBODIMENT

Figure 1:
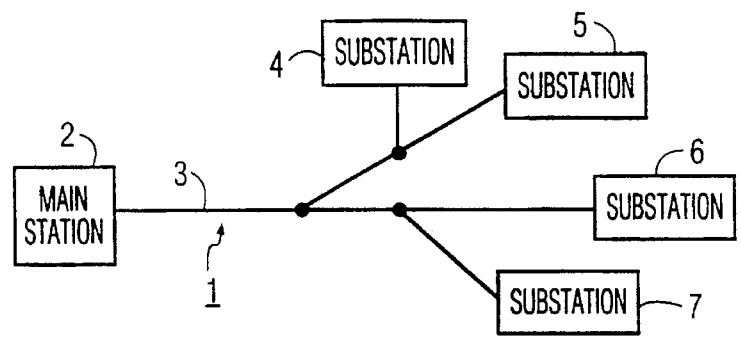

FIG. 1 schematically shows a telecommunication system 1 according to the present invention comprising a main station 2 communicating via a transmission channel with a plurality of substations 4, 5, 6 and 7. In practice there can be numerous substations. The channel 3, which is at least partially common to the substations 4 to 7, is a glass fibre cable in the case where the transmission system 1 is a Passive Optical Network (PON), also called PON-FITL-System (Fibre in the Loop). The main station 2 can be a local telephone exchange and to the substations 4 to 7 a subscriber or a group of subscribers can have access to various services such as telephone, facsimile and telex. In the latter case the system is a so-called TPON (Telephone Passive Optical Network). In a PON splitting and combining of optical signals on the channel for transport of information to and from the main station 2 is well-known. For details refer to general art in this field. The telecommunication system 1 can also be a mobile radio telephony system, in which the main station or stations 2 are fixed stations and the substations 4 to 7 are mobile stations such as portable telephones, mobile telephones etc., the transmission channel 3 then being a radio link. In the telecommunication system 1 multiple access protocol based communication between the main station 2 and base stations 4 to 7 occurs, such as TDMA (Time Division Multiple Access), well known in the art. In such a system 1 the main station, being a master controlling the system 1, transmits TDMA-frames, to be described in the sequel, to the substations 4 to 7, in a so-called downstream direction, whereas the substations 4 to 7 transmit information in an upstream direction to the main station 2. In such a system 1 access conflicts may arise if at special measures are not taken with respect to the timing of the upstream communication, varying and different transmission delays and frame positions must be adjusted in the substations before transmission. In the cited IEEE-article to this end coarse ranging is described, and in the cited WO 91/06 157 both coarse ranging and fine ranging. The present invention provides an improved coarse ranging method, to be described in the sequel, suitable for a system in operation, i.e. a system in which substations are ranged while other substations are in operation. The coarse ranging method according to the present invention can also be used at system start-up where no substations are in operation yet.

Figure 2:
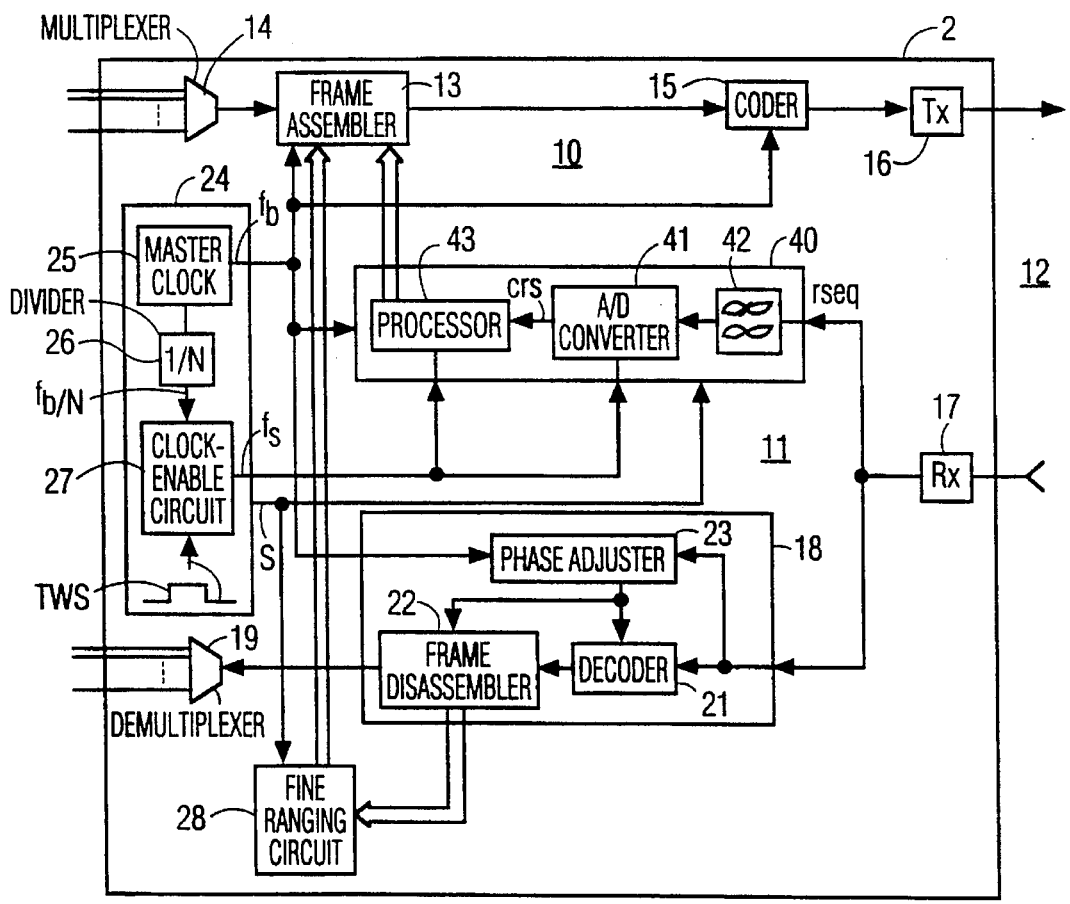

FIG. 2 shows a main station 2 for use in the telecommunication system 1 according to the present invention which is suitable for transmission and reception of TDMA signals. The main station 2 comprises a transmitter branch 10 and a receiver branch 11 coupled to a transmission channel 12. In the transmitter branch 10 subscriber signals for various substations are fed to a frame assembler 13 via a multiplexer 14. The multiplexed signal, also comprising synchronising and as the case may be coarse and fine ranging control information, is fed to the channel 12 after being coded in a coder 15, via a transmitter a 16. Channel coding is done for achieving a suitable frequency spectrum on the channel. Signals from the substations 4 to 7 are received by a receiver 17, an output of which is coupled to frame disassembling means 18 for providing information to various subscribers via a demultiplexer 19. The disassembling means 18 comprise a decoder 21 which is coupled to a frame disassembler 22. The decoder 21 and the disassembler 22 are provided with a clock signal by a Phase Adjustment circuit 23. The main station 2 further comprises timing and control means 24 comprising a system or master clock circuit for providing a master clock $f_b$, which is fed to the Phase Adjustment circuit 23 and to the frame assembler 13 inter alia. The master clock $f_b$ is divided by N, N being an integer, in a divider circuit 26 such that a clock $f_b/N$ is achieved. The clock $f_b/N$ is fed to a clock-enable circuit 27 enabling the clock $f_b$ with a time window signal TWS. A sample clock $f_s$ which is a windowed clock $f_b/N$, is used in coarse ranging according to the present invention. The timing and control means 24 further provide a start signal S to be used in coarse ranging according to the present invention, the start signal S being a fixed reference for the main station 2 for determining transmission delays or round-trip delay of the substations 4 to 7. The disassembler 22 is further coupled to fine ranging determining means 28 for determining fine delay information from free ranging pulses transmitted by the substations 4 to 7 at the request of the main station 2. The free ranging control information is assembled in the frames to be transmitted to the substations 4 to 7 by the frame assembler 13. The receiver 17 is further coupled to coarse ranging means 40 comprising an analog-to-digital digital converter 41 sampling a low magnitude ranging sequence rseq transmitted to the main station 2 by any substation 4 to 7 at the request of the main station 2. According to the present invention the low magnitude coarse ranging sequence is substantially only sampled when it is sure that no data from other substations are present, or in a slightly modified form with a slight overlap with possible data carrying parts of the frame, i.e. in a fine ranging window of which the position is known to the main station 2. In the latter case it is advantageous to choose a sample clock $f_s$, having a lower frequency than the bit clock or master clock $f_b$, and applying a low-pass filter 42 to filter out higher frequency 25 components of data signals. In case of substantially no overlap the filter can be dispensed with, thus achieving a simpler and cheaper system. Coarse ranging samples crs at an output of the analog-to-digital converter 41 are fed to processing means 43 for processing the coarse ranging samples. The processing means 43 provide coarse ranging information to the frame assembler 13 so that coarse ranging control information is transmitted to the substation to be coarse-ranged. The substation to be coarse ranged adjusts its delay before switching over to an active state for transmission of data signals, so that after coarse ranging fine ranging can take place at the request of the main station 2, if required, or at regular intervals.

Figure 3:
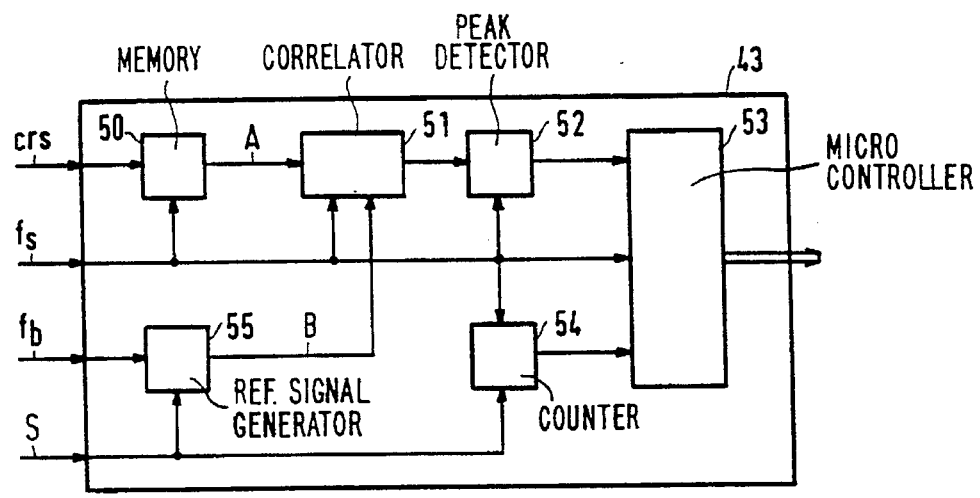

FIG. 3 shows in more detail the processing means 43 for processing coarse ranging samples crs according to the present invention. The processing means 43 comprise a memory 50 for storing the coarse ranging samples crs, which is coupled to a correlator 51. The coarse ranging signals crs stored in the memory 50 are stored as a digital signal A in a first shift register, to be shown later on, a second shift register, to be shown later on, of the correlator 51 comprising a pan of the a priori known coarse ranging sequence as a digital signal B, stored or generated in the main station 2 and generated in the substation to be coarse-ranged. By correlating pans of the coarse ranging sequence and shifting the coarse ranging sequence through the correlator 51, from the phase shift or position within the a priori known coarse ranging sequence the round trip; delay be determined, the delay in the a prior known ranging sequence being a measure of the round trip delay. For determining maximum correlation with each time a different pan of the sequence, the processing means 43 comprise a peak detector 52, which is coupled to a microcontroller 53 including a microprocessor with the usual RAM and ROM memory and I/O-interfaces. For determining relative delay with respect to the beginning of the frame each time, a counter 54 is provided. The a priori known sequence is generated with reference signal generating means 55, the reference sequence being a maximum length sequence e.g. generated by a polynomial $1 + x + x^{15}$ of length $2^{15} - 1$, the sequence being longer than a multiframe to be transmitted by the main station 2, i.e. it is ensured that the ranging window in a next upstream multiframe is always filled with a pan of the transmitted sequence by the substation. If a priori knowledge about the round trip delay is available a shorter sequence may be chosen. Chosen is a low power sequence with good correlation properties, the low power being necessary to prevent disturbance to the data by the sequence, which behaves like a Pseudo Noise Sequence. Because the phase of the Pseudo Noise sequence is not known in the main station 2, oversampling of the Pseudo Noise Sequence is necessary. Since the sampling clock $f_s$, is preferably chosen equal to the bit clock $f_b$, the frequency of the Pseudo Noise Sequence has to be reduced accordingly. With the coarse ranging according to the present invention a coarse ranging accuracy in the order of 1 bit of the Pseudo Noise Sequence can be obtained. The signal S provided by the timing and control means 24 assures appropriate timing with respect to the main station's multiframe.

Figure 4:
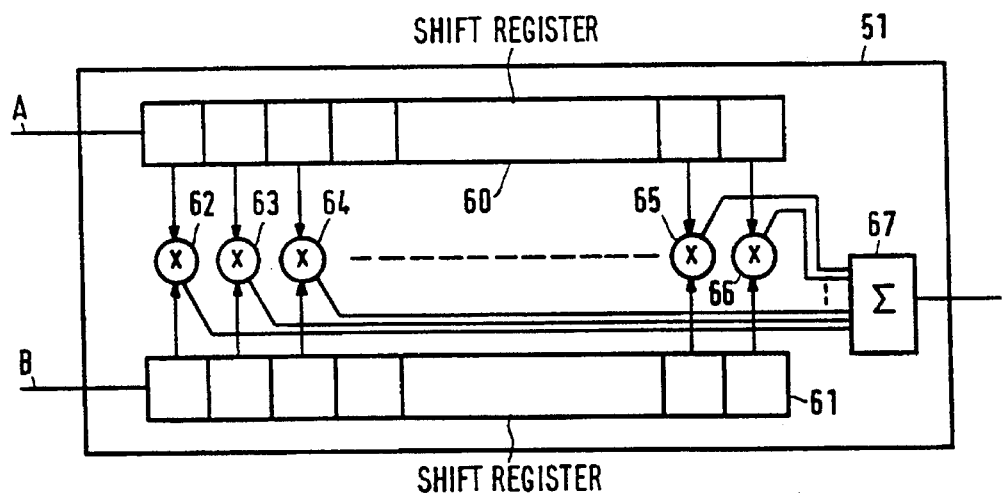

FIG. 4 shows an embodiment of the correlator 51 for use in the processing means 43. As described with respect to FIG. 3, the coarse ranging symbols A are stored in a first shift register 60, and symbols B, being a part of the reference Pseudo Noise sequence, are stored in a second shift register 61. Respective outputs of multipliers 62, 63, (>4, 65 and 66, multiplying corresponding symbols in the first and second shift register 60 and 61 are added by means of an adder 67 an output of which gives a correlation value which is fed to the microcontroller 53. The counter 54 is reset and started by means of the signal S. At each counter value a correlation value is determined and respective counter outputs are stored in a lookup table in the microcontroller 53 together with corresponding correlation values, and by then looking up the maximum correlation value with its corresponding counter value, the coarse offset delay can be calculated and transmitted to the respective substation. Instead of applying a lookup table a peakdetector 52 can be used to locate the maximum correlation value. Then, with each counter value the correlation value is compared with a previous maximum correlation value, and the maximum correlation value is updated if the current value exceeds the previous maximum value, together with the corresponding counter value. It is thus achieved that after correlation the maximum correlation value and the corresponding counter value are immediately available. The calculation algorithm, which correlates the sampled part of the sequence with the original sequence is as follows:

$$c_j = \frac{1}{M} \sum_{i=1}^{M} a_i \, b_{i+j}, j = 0, 1, \ldots, j_{max}$$

M being the number of samples, the sampled sequence being $a_i$, $i = 1, 2, \ldots, M$, and the original maximum length sequence being $b_i$, $i = 1, 2, 3, \ldots, 2^{15} - 1$. The coefficients $b_i$ are +1 or −1, with equal probability, i.e. $Pr(b_i = -1) = Pr(b_i = +1) = 0.5$. The number of correlation values $c_j$ to be computed is $j_{max}$, depending on the maximum round trip delay between the substations 4 to 7 and the main station 2. It should hold that $j_{max}.T$ is greater than the maximum delay, T being the symbol period. A fixed delay $D_r$ is set between downstream and upstream multiframes. For a location index $j_o$ corresponding to the maximum value of the correlation values $c_j$, the coarse delay offset $E_c$ is:

$$E_c = (D_r - j_o).T$$

The correlator 51 can also be implemented in software, loaded in ROM or EPROM of the microcontroller 53, i.e. the above algorithm can be implemented in hardware and in software. The maximum correlation value, which is a measure of the received power in the main station 2, is also used for power control purposes. To this end the main station 2 determines a measure of the received power from the maximum correlation value, compares the measure with a desired measure and transmits power control information to the substations 4 to 7 in the form of a deviation of the measure of the received power from the desired measure. The substations 4 to 7 adjust their transmission power accordingly. At the end, it is thus achieved that all substation signals are received by the main station 2 with substantially equal power.

Figure 5:
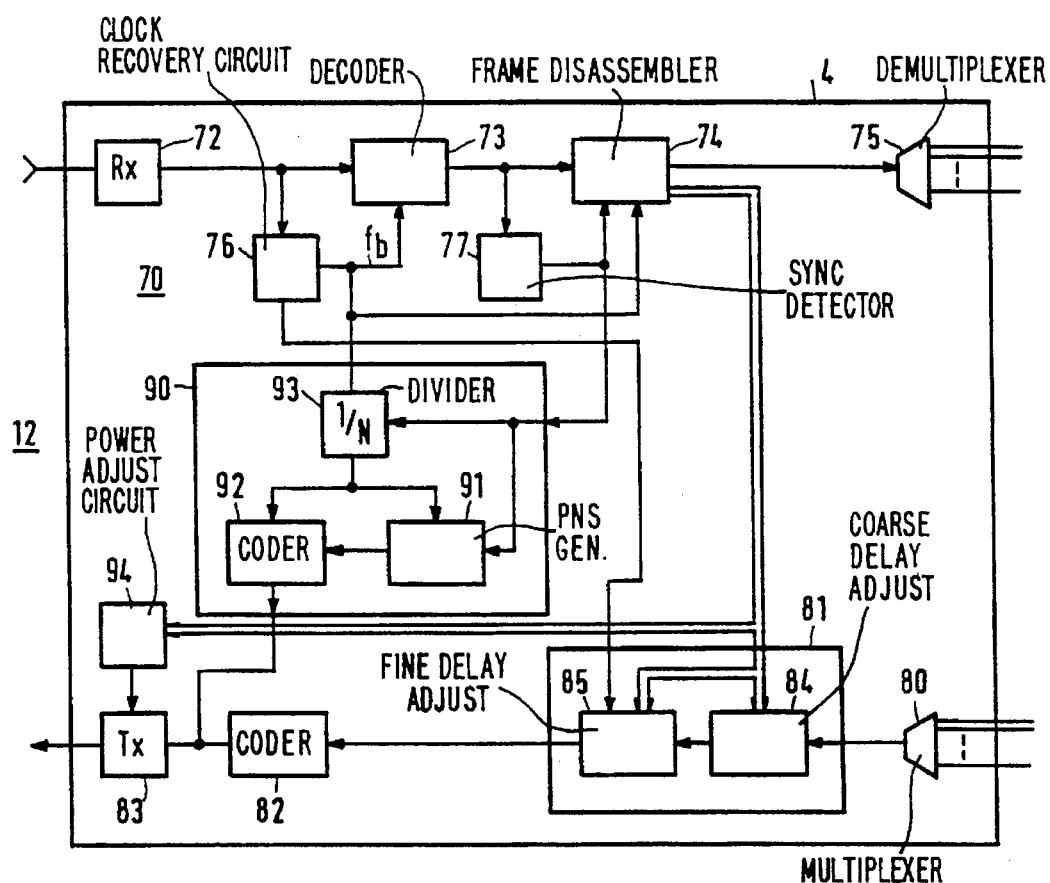

FIG. 5 shows a substation 4 for use in the telecommunication system 1 according to the present invention. The substation 4 comprises a receiver branch 70 and a transmitter branch 71 coupled to the transmission channel 12. The receiver branch 70 comprises a series arrangement of a receiver 72, a decoder 73, a frame disassembler 74 and a demultiplexer 75. At the receiver output a clock is recovered by means of a clock recovery circuit 76, whereas a sync detector 77 is coupled with an output of the decoder 73. The transmitter branch 71 comprises a series arrangement of a multiplexer 80, coarse and fine adjustment means 81, a coder 82, and a transmitter 83. Functionally, the substations 4 to 7 operate similar to the main station 2, as far as transmission and reception is concerned. The coarse and fine adjustment means 81 comprise a coarse delay adjustment section 84 and a free delay adjustment section 85, both coupled to the frame disassembler 74, which provides coarse and fine adjustment control information from the main station 2 via housekeeping time slots in the downstream multiframe. In order to obtain fine adjustments smaller than a symbol period, the fine delay adjustment section 85 can be clocked with a higher frequency than the symbol frequency lb. To this end, the clock recovery circuit 76 comprises a separate clock output with a higher clock. For generating the low magnitude ranging sequence to be transmitted to the main station 2, the substation 4 comprises sequence generating means 90 comprising a Pseudo Noise Signal generator 91 and a coder 92 which is coupled to the transmitter 83. PNS generator 91 and the coder 92 are clocked by a clock $f_b/N$ derived from an output of the clock recovery circuit 76, the output being fed to a divider circuit 93. The sequence generating means are initiated at a request for coarse ranging originating from the main station 2 and are actually started at a predetermined time reference with respect to the received multiframe down. The substation 4 also comprises power adjustment means 94 which are coupled to the transmitter 83 and to the frame disassembler 74, the power adjustment means 94 adjusting the power to be transmitted by the substation 4 in accordance with the received power control information transmitted by the main station 2.

Figure 6:
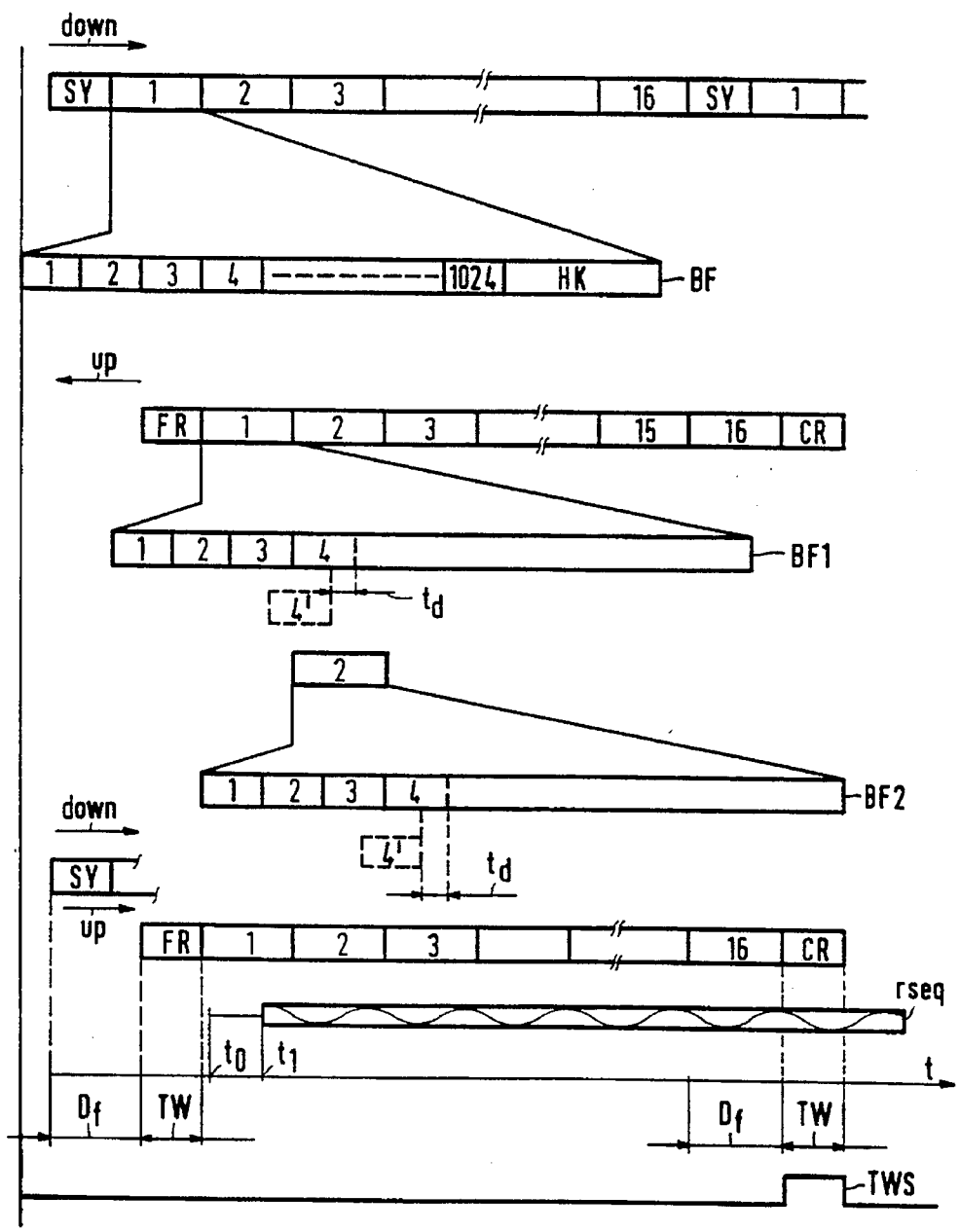

FIG. 6 shows a IDMA frame structure used in the telecommunication system 1, illustrating coarse ranging according to the present invention. Shown are a multiframe down in downstream direction and a multiframe up in upstream direction. The main station 2 transmits multiframe down, assembled with the assembler 13 in downstream direction. In the given example, the multiframe down comprises a sync time slot SY allowing the substations to synchronize to the main station multiframe down and to extract the time slots allocated to them. In the given example, the multiframe down comprises 16 basic frames BF, each having 1024 time slots available for data transport and each having housekeeping time slots HK. Preferably, the upstream multiframe up has a similar structure as to data and housekeeping time slots, but instead of a sync time slot, a time window CR is reserved in the frame for ranging purposes. In a preferred embodiment, the time window CR substantially coincides with a window FR reserved in the frame for fine ranging, at a corresponding location in the upstream multiframe up. In the latter case a coarse ranging request could be initiated in a given multiframe, and coarse ranging samples could be taken in the next succeeding frame within the same time window that would otherwise be used for fine ranging. In systems in which both coarse and fine ranging is done, such ranging would give rise to a better frame efficiency as compared with systems using separate windows for coarse and free ranging, the main station 2 sets a fixed delay $D_f$ for the multiframe up for communication in the upstream direction with respect to the multiframe down, i.e. the main station sets a fixed reference for listening to the substations 4 to 7. According to the present invention samples are taken inside a time window TW which substantially does not overlap with data time slots in the basic frames BF. In the system 1 many subscribers can be serviced. Assuming one time slot per subscriber, in the given example 1024 subscribers can be serviced at a time. When subscribers occupy more time slots, the total number of subscribers which can be serviced at a time is less. In the system 1, to each substation 4 to 7 a number of subscribers can be coupled, whereby to each subscriber a time slot or a number of time slots can be allocated. Once a substation is coarse-ranged, time slot allocation can take place. Also, to a ranged substation, time slots may be allocated dynamically later on. In the given example it is assumed that a given substation to which a time slot 4 and possibly other time slots are to be allocated in the basic frame BF is to be coarse-ranged. It is further assumed that the relevant substation, when not coarse-ranged yet, would transmit the time slot 4 in a shifted position such that interference with another time slot would occur. This is indicated with a time slot 4'. With the coarse ranging according to the present invention it is achieved that a delay in the substation is adjusted such that a time delay $t_d$ is eliminated. It is to be noticed that the relevant subscriber would transmit data in corresponding time slots of successive basic frames BF1, BF2, etc. The relevant substation determines its transmission delay with respect to a fixed reference point, e.g. with respect to the received sync time slot SY. The frames are shown as a function of time t. At $t=t_o$, the substation, to which the time slot 4 and possibly other time slots are to be allocated, receives a coarse ranging request and transmits a low power coarse ranging sequence rseq at $t=t_1$, in a given example, assuming no a priori knowledge about the transmission delay, the ranging sequence being longer than a multiframe up. According to the present invention, the coarse ranging sequence rseq is sampled in the time window TW by means of the analog-to-digital converter 41 in the main station 2, enabled by the time window signal TWS. During the time window TW normally no substation will transmit data, i.e. no interference with data will occur and only receiver noise is present. Consequently, the signal-to-interference ratio in the time window TW is an order of magnitude better than in the other pan of the multiframe up. Due to the improved signal-to-interference ratio the phase of the Pseudo Noise Sequence can be determined more accurately without prefiltering being necessary.

Figure 7:
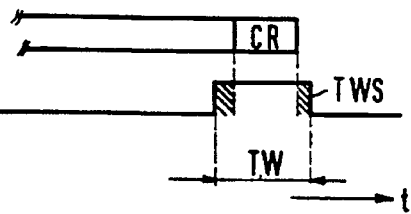

FIG. 7 shows a part of the TDMA frame structure with respect to an embodiment of the present invention in which the time window signal TWS is slightly broader than in the previous example given. For the rest the frame structure is similar to the structure shown in FIG. 6. In this embodiment there is a slight overlap with data carrying time slots. Because of having more samples available the correlation process is more accurate. The overlapping range should not be too broad due to the then occurring interference with data signals, reducing the advantages of the present invention. Although a cheaper solution is obtained without a filter being used for prefiltering the sequence in the main station at reception, in this embodiment a simple filter such as a second order Chebyshev-filter could be used, filtering out higher frequency data components.

Figure 8:
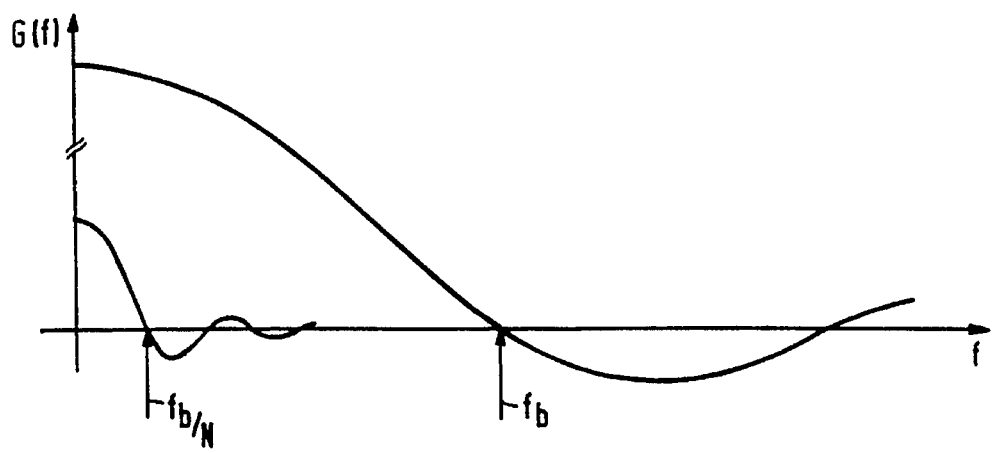

FIG. 8 shows a frequency spectrum of ranging bits and data in an embodiment of the present invention. The above mentioned Chebyshev-filter, the low-pass filter 42 in the main station 2 could have a cut-off frequency of the Pseudo Noise Sequence bit frequency, whereas the data frequency would be a factor four higher, thus filtering out higher frequency data components.

In the example given the coarse ranging means 40 and/or the fine ranging means 28 are comprised in the main station 2, i.e. a centralized system is described. In another, decentralized, embodiment the coarse and/or fine ranging means 40 and 28 are comprised in the substations 4 to 7. Then, the main station 2 acts as a relay station for relaying the ranging information transmitted by the substations 4 to 7. The ranging process may be started on the initiative of the main station 2 or on the initiative of the substations 4 to 7 to be ranged.

What is claimed:

1. A telecommunication system comprising: a main station and a plurality of substations, in which system communication between the main station and the substations occurs by transmission of data samples via a transmission channel in accordance with a multiple access protocol of respective time slots in successive data frames, which channel is common to the substations, wherein for coarse ranging the substations include ranging transmission means for transmitting in a data frame a ranging sequence of samples of low magnitude with respect to the magnitude of data samples to be transmitted in the time slots of said data frame, and the main station includes correlation means for recovering ranging information by correlating a received ranging sequence (rseq) with a reference sequence which is identical to a transmitted sequence, the main station comprising means for providing the reference sequence; and, for coarse ranging, the correlation means principally correlates those samples of a received ranging sequence which fall within a time window reserved for ranging in said data frame.

2. A telecommunication system according to claim 1, wherein the time window substantially coincides with a window reserved in the frame for fine ranging.

3. A telecommunication system according to claim 1, wherein the bitrate of the ranging sequence ($f_b/N$) is lower than the data bitrate ($f_b$) of the substations, and in which, in addition to correlation of samples of the received ranging sequence inside the time window, the correlation means correlate samples of the received ranging sequence outside the time window, substantially more samples being taken inside the time window than outside the time window.

4. Telecommunication system according to claim 3, wherein the main station comprises a low-pass filter for filtering the received ranging sequence before it is fed to the correlation means, the low-pass filter having a cut-off frequency substantially coinciding with the frequency ($f_b/N$) of the received ranging sequence.

5. Telecommunication system according to claim 1, wherein the correlation means determine maximum correlation values by correlating the received ranging sequence with the reference sequence for each substation to be coarse-ranged, determine a received power measure from the maximum correlation values, and transmit power control information to the substations for adjustment of transmitting power in accordance with a deviation of the received power measure with respect to a desired power measure, the substations comprising power adjustment means for adjusting the transmitting power in accordance with the power control information.

6. A telecommunication system comprising: a main station and a plurality of substations, in which system communication between the main station and the substations occurs by transmission of data samples via a transmission channel in accordance with a multiple access protocol of respective time slots in successive data frames, which channel is common to the substations, wherein for coarse ranging the substations include ranging transmission means for transmitting in a data frame a ranging sequence of samples of low magnitude with respect to the magnitude of data samples to be transmitted in the time slots of said data frame, correlation means for recovering ranging information by correlating a received ranging sequence relayed by the main station with a reference sequence which is identical to the transmitted sequence, and means for providing the reference sequence; and, for coarse ranging, the correlation means principally correlate those samples of a received ranging sequence which fall within a time window reserved for ranging in said data frame.

7. A main station for use in a telecommunication system according to claim 1, comprising: receiving means for receiving data samples transmitted in time slots of data frames from said substations, and further receiving ranging sequences transmitted by the substations for coarse ranging; correlation means for recovering ranging information by correlating a received ranging sequence with a reference sequence which is identical to the transmitted sequence; and means for providing the reference sequence; and, for coarse ranging, the correlation means principally correlate those samples of a received ranging sequence which fall within a time window reserved for ranging in said data frame.

8. The main station according to claim 7, wherein the correlation means determine received power values from maximum correlation values and transmit power control information to the substations for power adjustment in accordance with a deviation of the received, power values with respect to desired power values.

9. A telecommunication system according to claim 2, in which the bitrate of the ranging sequence ($f_b/N$) is lower than the data bitrate of the substations ($f_b$), and in which, in addition to correlation of samples of the received ranging sequence inside the time window, the correlation means correlate samples of the received ranging sequence outside the time window, substantially more samples being taken inside the time window than outside the time window.

10. The main station as claimed in claim 7 comprising:

frame assembler means having an output, a multiplexer for supplying to the frame assembler means signals containing coarse and fine ranging data, which signals are destined for the substations, a coder circuit coupled to the output of the frame assembler means, a transmitter circuit coupled to an output of the coder circuit, and timing and control means having an output coupled to said frame assembler means and to said coder circuit for supplying synchronizing clock signals thereto.

11. The main station as claimed in claim 10 further comprising a receiver channel which comprises:

a receiver which receives signals from the substations via said transmission channel, frame disassembler means having an input coupled to an output of the receiver, a demultiplexer having an input coupled to an output of the frame disassembler means, and means coupling a control input of said frame disassembler means to said output of the timing and control means.

12. The main station as claimed in claim 11 wherein said frame disassembler means comprises:

a decoder circuit and a frame disassembler circuit connected in cascade between said input and said output of the frame disassembler means, and a phase adjustment circuit having first and second inputs coupled to said input of the frame disassembler means and to said control input thereof, respectively, and having output means coupled to respective further inputs of the decoder circuit and the frame disassembler circuit.

13. The main station as claimed in claim 12 wherein said timing and control means includes means responsive to said clock signals for deriving a time window signal, said main station further comprising;

coarse ranging means having an input coupled to the output of said receiver and output means coupled to a further input of the frame assembler means, wherein said coarse ranging means comprises:

an analog/digital converter and said correlation means coupled in cascade to the input of the coarse ranging means, said correlation means having output means that comprise the output means of the coarse ranging means, and means for coupling a control input of said correlation means to a further output of the timing and control means at which said time window signal appears.

14. The main station as claimed in claim 13 wherein said main station further comprises:

fine ranging means having input means coupled to output means of the frame disassembler means, and output means coupled to a still further input of the frame assembler means.

15. A substation for use in a telecommunication system according to claim 1 comprising:

a receiving channel including, in cascade, a receiver, a decoder, and a frame disassembler means, a clock recovery circuit having an input coupled to an output of the receiver and a first output supplying a clock signal of a frequency $f_b$ to respective control inputs of the decoder and the frame disassembler means, a sync detector having an input coupled to an output of the decoder and an output coupled to a further control input of the frame disassembler means, a sequence generating means for deriving a low magnitude ranging sequence for transmission to the main station, said sequence generating means having first and second inputs coupled to said first output of the clock recovery circuit and to said output of the sync detector, respectively, and means coupling an output of the sequence generating means to an input of a transmitter.

16. A substation for use in a telecommunication system according to claim 15 further comprising a transmitting channel which comprises:

coupled in cascade, a multiplexer, delay adjustment means, a coder circuit, and said transmitter, wherein said delay adjustment means includes control input means coupled to output means of said frame disassembler means and to a second output of the clock recovery circuit which second output supplies a further clock signal at a higher frequency than said clock signal of frequency $f_b$.

17. A substation for use in a telecommunication system according to claim 16 wherein said delay adjustment means comprises;

coupled in cascade between the multiplexer and the coder circuit, a coarse delay adjustment circuit and a fine delay adjustment circuit, wherein said coarse and fine delay adjustment circuits are controlled by said output means of the frame disassembler means via said control input means of the delay adjustment means and said fine delay adjustment means is further controlled by the further clock signal at the second output of the clock recovery circuit and via said control input means of the delay adjustment means.

18. The telecommunication system as claimed in claim 1 wherein said transmission channel comprises a passive optical network (PON) that includes a glass fiber cable coupling the main station to the substations.

19. The telecommunication system as claimed in claim 1 which comprises a mobile radio telephony system in which said substations are mobile and the transmission channel comprises a radio link.

20. The telecommunication system according to claim 1, wherein the main station comprises a low-pass filter for filtering the received ranging sequence before it is fed to the correlation means, the low-pass filter having a cut-off frequency substantially coinciding with the frequency of the received ranging sequence.

* * * * *